United States Patent [19]

Shoji et al.

[11] 4,413,090

[45] Nov. 1, 1983

[54] CYANOETHYLATED OLEFIN-VINYL ALCOHOL COPOLYMER AND DIELECTRIC MATERIAL AND ADHESIVE COMPRISING THE SAME

[75] Inventors: Masuhiro Shoji; Teruo Sakagami; Naohiro Murayama, all of Iwaki, Japan

[73] Assignee: Kureha Kagaku Kogyo Kabushiki Kaisha, Tokyo, Japan

[21] Appl. No.: 366,031

[22] Filed: Apr. 6, 1982

[30] Foreign Application Priority Data

Apr. 6, 1981 [JP] Japan ................................. 56-50516
Apr. 7, 1981 [JP] Japan ................................. 56-51243

[51] Int. Cl.$^3$ .............................................. C08F 8/30
[52] U.S. Cl. ..................................... 525/59; 252/512; 252/518; 428/441; 428/461; 428/516; 428/917; 524/205; 524/233; 524/259; 524/365; 525/60
[58] Field of Search .......................................... 525/59

[56] References Cited

U.S. PATENT DOCUMENTS 2,341,553 2/1944 Houtz ..................................... 525/59
2,861,051 11/1958 Caldwell ............................... 525/59
3,194,798 7/1965 Frost ..................................... 525/59

FOREIGN PATENT DOCUMENTS 1190018 4/1970 United Kingdom .

*Primary Examiner*—Stanford M. Levin
*Attorney, Agent, or Firm*—Sughrue, Mion, Zinn, Macpeak & Seas

[57] ABSTRACT

A cyanoethylated resin to which adhesive properties and high dielectric constant are imparted by cyanoethylating a $C_2$–$C_4$ olefin-vinyl alcohol copolymer, which is suitable for use as a dielectric material and an adhesive.

5 Claims, 3 Drawing Figures

FIG. I

CYANOETHYLATED OLEFIN-VINYL ALCOHOL COPOLYMER AND DIELECTRIC MATERIAL AND ADHESIVE COMPRISING THE SAME

FIELD OF THE INVENTION

The present invention relates to a cyanoethylated resin, and more particularly, to a cyanoethylated resin to which adhesive properties and high dielectric constant are imparted by cyanoethylating an olefin-vinyl alcohol copolymer, and a dielectric material and adhesive using the resin.

BACKGROUND OF THE INVENTION

Modification of high molecular weight substances has been performed by various chemical reactions to change the properties of the high molecular weight substances and to impart new functions to the high molecular weight substances. One example of such a modification is cyanoethylation with acrylonitrile. The most representative product obtained by such a cyanoethylation is a cyanoethylated cellulose. Due to its good solubility in many solvents, high dielectric constant and transparency, the cyanoethylated cellulose is used as a binder for illuminants of dispersion-type electroluminescent elements. The cyanoethylated cellulose is also expected to use as a condenser film. The cyanoethylated cellulose, however, has poor adhesive properties to various high molecular weight substances, metals and glasses. Therefore, where the cyanoethylated cellulose is used as a dielectric material or as a binder thereof, the cyanoethylated cellulose does not closely bond to electrodes thereby causing air spaces therebetween. As a result, there is disadvantage such that the high dielectric constant of this material is not utilized effectively.

SUMMARY OF THE INVENTION

It has been found that a cyanoethylated olefin-vinyl alcohol copolymer prepared by cyanoethylation of an olefin($C_2$-$C_4$)-vinyl alcohol copolymer has an extremely high dielectric constant as compared with that of the cyanoethylated cellulose and also has very high adhesive properties to metals and glasses as well as to polyvinylidene fluoride which has very poor adhesive properties to other resins.

It has been also found that when the cyanoethylated olefin-vinyl alcohol copolymer is used as a dielectric resin to form a luminous layer, the resulting dispersion-type electroluminescent element is much superior in brightness and mechanical characteristics such as flexibility to the conventional element which employs cyanoethyl cellulose as a resin forming the luminous layer.

Accordingly, one object of this invention is to provide a cyanoethylated $C_2$-$C_4$ olefin-vinyl alcohol copolymer.

Another object of this invention is to provide a dielectric material comprising the cyanoethylated $C_2$-$C_4$ olefin-vinyl alcohol copolymer.

Still another object of this invention is to provide an adhesive comprising the cyanoethylated $C_2$-$C_4$ olefin-vinyl alcohol copolymer.

DETAILED DESCRIPTION OF THE INVENTION

Figure 1:
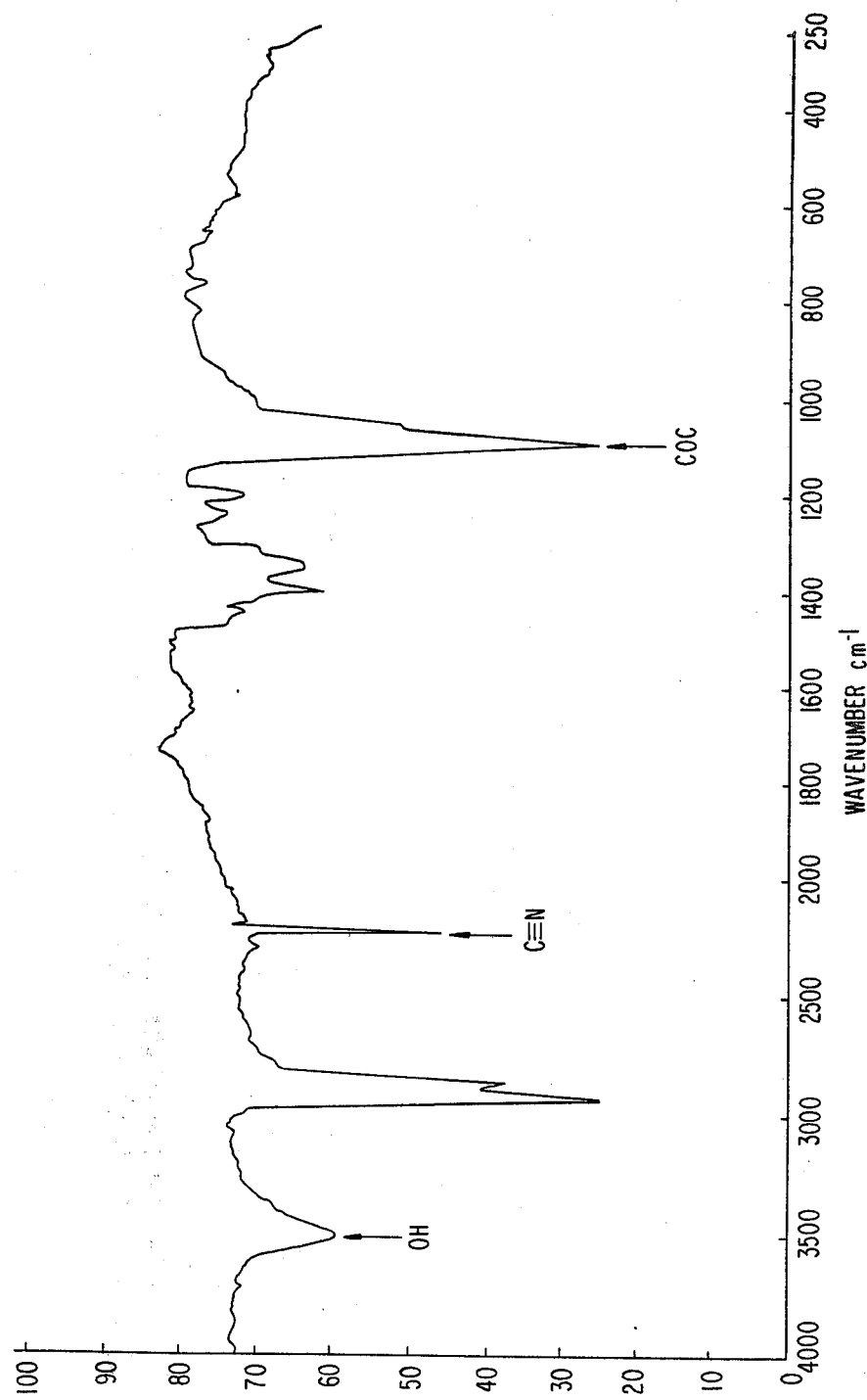
FIGS. 1, 2 and 3 are graphs showing infrared absorption curves of films prepared from the cyanoethylated olefin-vinyl alcohol copolymers according to this invention.

The olefin-vinyl alcohol copolymer which can be used in this invention is a high molecular weight compound having an average molecular weight of from 500 to 100,000 which is prepared by copolymerizing vinyl acetate and an olefin having 2 to 4 carbon atoms and then saponifying the copolymer. The process for preparing the copolymer is disclosed, for example, in British Pat. No. 1,190,018. The olefin content in the copolymer is not specifically limited but is usually from 10 to 70 mol%, with the remaining 90 to 30 mol% being vinyl alcohol or unsaponified vinyl acetate. The degree of saponification of the vinyl acetate is optional, but is usually at least 80%.

The cyanoethylation of the olefin-vinyl alcohol copolymer is usually accomplished by treating the copolymer with acrylonitrile in the presence of a small amount of an aqueous solution of caustic alkali as a catalyst. The reaction temperature is preferably from 0° C. to 80° C. In more detail, the cyanoethylation is performed as follows: A small amount (usually 0.1 to 10 wt% based on the weight of the copolymer) of an aqueous solution of caustic alkali and acrylonitrile are added simultaneously or the aqueous solution of caustic alkali is added and then acrylonitrile is then added to powders or chips of the olefin-vinyl alcohol copolymer to proceed reaction while stirring. The cyanoethylated copolymer gradually dissolves in the excess acrylonitrile and the reaction further proceeds. The reaction is stopped at an appropriate stage, and unreacted acrylonitrile is recovered and the reaction product is purified.

The degree of cyanoethylation can be selected optionally according to the use and the production cost. If it is required to impart polarity to the surface of film or fiber thereby improving dyeability or affinity to water, several percent or less of hydroxyl groups in the vinyl alcohol is generally cyanoethylated. However, if it is required to vary the dielectric constant of the copolymer itself, at least 10%, preferably 30 to 100%, of hydroxyl groups is cyanoethylated.

The ethylene-vinyl alcohol copolymer thus cyanoethylated is thermoplastic and a film produced therefrom has a high dielectric constant.

As will be apparent in the examples described hereinafter, a cyanoethylated ethylene-vinyl alcohol copolymer having the ethylene content of 68 mol% and the degree of cyanoethylation of the vinyl alcohol portion being about 90% has a dielectric constant of about 20 at 1 KHz and 25° C.

The cyanoethylated olefin-vinyl alcohol copolymer according to this invention has olefin chains, and therefore has superior flowability at melting and thermal stability. In particular, the copolymer has excellent adhesive properties. For example, when the cyanoethylated copolymer is cast or melted onto a glass plate or aluminum plate, the copolymer firmly bonds at room temperature and does not peel off easily.

The cyanoethylated copolymer is insoluble in water, but is well soluble in polar solvents such as acetone, methyl ethyl ketone, dimethyl formamide, dimethyl acetamide, acrylonitrile, and nitromethane. Therefore, the copolymer can be used as an adhesive in the form of the solution thereof and also in the form of a film prepared by molding.

The copolymer has particularly the following advantages when used as a dielectric resin for forming the illuminant layer of a dispersion-type electroluminescent element.

The dispersion-type electroluminescent element is an element which emits when an alternating electric field is applied to an illuminant layer composed of a resin having a high dielectric constant and a fluorescent substance such as ZnS dispersed therein. The illuminant layer can be formed into a thin, flexible film of desired size. Due to this advantage, a practical display using the copolymer is attempted. The matrix resin in which a fluorescent substance is dispersed has preferably a higher dielectric constant where high brightness is required, but such a high dielectric constant alone is not still sufficient. The matrix resin is required to be transparent and to have a high dielectric strength to increase brightness. In addition, the matrix resin is required not to impair the flexibility which is one of the characteristics of a dispersion-type electroluminescent element.

Epoxy resins and cyanoethyl cellulose are conventionally known as such a matrix resin. The epoxy resins, however, are not preferred due to its low dielectric constant. The cyanoethyl cellulose has an extremely high dielectric constant such as a dielectric constant of 15 or higher when the degree of cyanoethylation is 80% or more, though varying depending upon the degree of cyanoethylation, and therefore is very useful from the viewpoint of dielectric constant.

Electrodes are required in an electroluminescent element to apply voltage to the illuminant layer which is prepared by dispersing a fluorescent substance into a matrix resin and forming it into a film. The electrode on the front side is a transparent electrode made of, for example, ITO, a mixture of indium oxide and tin oxide, or tin oxide to permit light emission. The electrode and the illuminant layer are firmly bonded together. The rear side of the illuminant layer is usually in direct contact with the electrode, but in some cases, illuminant layer formed by dispersing a fluorescent substance into the matrix resin is not uniform and uniform voltage application is difficult, and therefore a dielectric reflecting layer prepared by dispersing a white powder such as titanium oxide powder in the same or other matrix resin is provided. Close adhesion to this rear layer is also required. In the case of providing the dielectric reflecting layer, the dielectric reflecting layer in which the matrix resin is a resin having good adhesive properties to the illuminant layer can be used and the adhesive properties are not serious problem. If the illuminant layer has good adhesive properties, it is further advantageous that the illuminant layer can bond to a transparent dielectric film of high dielectric constant instead of the dielectric reflecting layer, by depositing a reflective metal such as nickel or aluminum on the rear side of the film to form a mirror surface, the dielectric film functions as a dielectric layer and the mirror of deposited metal functions as a reflecting surface.

On the contrary, the cyanoethyl cellulose has poor adhesion to a transparent electrode such as ITO or tin oxide, and a high molecular weight substance. Therefore, an illuminant layer in which cyanoethyl cellulose is the matrix resin tends to form an air space between the illuminant layer and the transparent electrode layer. This often makes is impossible to apply sufficient and uniform electric field to the illuminant layer.

The cyanoethylated olefin-vinyl alcohol copolymer according to this invention is extremely superior in dielectric constant, transparency and adhesion to transparent electrode, when used as a dielectric resin to form the illuminant layer.

Conventional fluorescent substances can be used as the fluorescent substance which is dispersed into the matrix resin in this invention. The representative examples of the fluorescent substance are ZnS alone; ZnS in combination with at least one of Cu, I, Cl, Al, Mn and $NdF_3$; and the like.

The fluorescent substance and matrix resin are mixed in a volume ratio of 100:10 to 100:300, preferably 100:50 to 100:200. If the amount of resin exceeds the range, the brightness becomes low since the content of fluorescent substance is low. On the other hand, if the amount of resin is lower than the range, the content of fluorescent substance is too high and pinholes tend to occur easily. This makes it impossible to increase the electric field applied and hence the brightness is low.

The fluorescent substance and matrix resin can be mixed in any manner to form the illuminant layer. For example, the fluorescent substance and matrix resin are mixed directly and then extruded into a film or press molded to form a film. This method can provide a film for illuminant layer uniformly mixed due to good flowability of the resin. Alternatively, the fluorescent substance and matrix resin are mixed in a solvent and the resulting mixture is cast into a film to prepare a film of uniform illuminant layer.

The cyanoethylated olefin-vinyl alcohol copolymer used as the matrix resin in this invention has extremely excellent transparency such that emitted light is not almost absorbed in the resin even when the illuminant layer is comparatively thick. The thickness of the illuminant layer is usually in the range of from 5 to 100 microns.

The element made of the copolymer according to this invention can be any structure. As one example, the illuminant layer is placed on the substrate electrode, with or without a dielectric reflecting layer or transparent dielectric layer interposed between them, and the illuminant layer is further covered with a transparent electrode such as ITO. The transparent electrode is formed directly on the illuminant layer by means of deposition, sputtering or coating, or a transparent electrode such as ITO formed on a polyester film or polycarbonate film is heat bonded to the illuminant layer. Further, in the case of using a high dielectric constant film on which a transparent electrode such as ITO is formed, the film surface opposite to the transparent electrode is bonded to the illuminant layer.

The illuminant layer film composed of a fluorescent substance and matrix resin can be simply interposed between the ITO deposited film (with the ITO side at either the illuminant layer side or the opposite side) and the lower electrode layer having, if desired, the (reflecting) dielectric layer and heat pressed to bond easily the illuminant layer to the ITO deposit film and also the lower electrode. Instead of using an illuminant layer in the form of film, the illuminant layer can be formed on the ITO deposited film or the lower electrode layer by a casting method, followed by evaporation of the solvent at room temperature, and in such a case, good bonding to the ITO deposited film or lower electrode can be established.

In the case that the high molecular weight film surface of the ITO deposited film contacts the illuminant layer, it is required to use a high molecular weight film having a dielectric constant as high as possible and to apply a sufficiently high voltage to the illuminant layer.

The suitable examples of such a high dielectric constant film include a film of a vinylidene fluoride polymer or a copolymer comprising vinylidene fluoride and a monomer copolymerizable therewith. The cyanoethylated olefin-vinyl alcohol of this invention has excellent bonding properties to such vinylidene fluoride polymer or copolymer.

If such a high dielectric constant film is present between the transparent electrode and illuminant layer, this film functions as a dielectric layer to uniformly distribute the voltage to the illuminant and, therefore, the dielectric reflecting layer or transparent dielectric layer to be interposed between the lower electrode and the illuminant layer can be omitted. A cyanoethylated olefin-vinyl alcohol copolymer can be used as the ITO deposited high molecular weight film of high dielectric constant. In such a case, it is preferred that the high molecular weight film has a high dielectric constant as well as good insulation properties and the cyanoethylated ethylene-vinyl alcohol copolymer has a high ethylene group content to increase the dielectric strength, even if sacrificing the dielectric constant. In the case that the ITO surface is bonded directly to the illuminant layer, the high molecular weight film for the deposited film is not required to have a high dielectric constant, and a transparent film such as a polyester resin film or polycarbonate resin film can be used. The illuminant layer of this invention has extremely excellent bonding properties to ITO.

The cyanoethylated olefin-vinyl alcohol copolymer can also be used as the transparent dielectric layer film and the matrix resin for the dielectric reflecting layer which is, if desired, interposed between the illuminant layer and the lower electrode.

The electroluminescent element of this invention has extremely excellent bonding properties even in the case that the illuminant layer is bonded directly to the electrode or a high dielectric constant resin layer is interposed between the illuminant layer and the electrode. Further, due to the structure that a fluorescent substance is dispersed in a high dielectric constant resin, a high voltage can apply uniformly to the fluorescent substance and, as a result, voltage emission with extremely high efficiency and high brightness can be achieved.

The illuminant layer of this invention has sufficient bonding properties which can be applied to any structures described above. The electroluminescent element having such a structure according to this invention can provide an electroluminescent element having a high brightness based on the advantage that a high dielectric constant of the matrix resin for the illuminant layer gives good bonding properties to the transparent electrode.

The invention will now be described in more detail by reference to the following examples which, however, are not to be construed as limiting this invention in any way.

EXAMPLE 1

30 g of finely cut film of ethylene-vinyl alcohol copolymer ("Eval EP-F", ethylene content: 32 mol% and an average degree of polymerization: 1,500, made by Kuraray Co., Ltd.) and 15 cc of an aqueous solution of sodium hydroxide containing 0.6 g of sodium hydroxide were charged into a flask equipped with a reflux condenser and the temperature of the flask was maintained at 50° C. Then, 140 g of acrylonitrile was gradually added dropwise to the flask while vigorously stirring. After 90 minutes, the finely cut film dissolved completely in the acrylonitrile. After removing unreacted acrylonitrile in vacuo, the residue was dissolved in a large amount of acetone and the acetone solution was poured into a large amount of water to precipitate cyanoethylated ethylene-vinyl alcohol copolymer. After washing the precipitated copolymer with methanol, the procedure of dissolution in acetone solution and precipitation in water was repeated, and the precipitate was finally dried in vacuo at 60° C. It was confirmed by the measurement of nitrogen content that the degree of cyanoethylation was about 90%.

The cyanoethylated ethylene-vinyl alcohol copolymer obtained in this example was press molded into a film at 180° C. between a 50μ thick aluminum foil and a teflon plate to measure the dielectric constant. The film had a dielectric constant of 19.5 at 1 KHz and 25° C. The infrared absorption curve of this film is shown in FIG. 1.

An acetone solution of the copolymer was applied to a glass plate and dried at 80° C. to remove acetone. The resulting film was tightly bonded to glass and was not peeled off easily. The same result was obtained in the use of an aluminum plate. Thus, the copolymer had good bonding properties to glass and metal.

EXAMPLE 2

Ethylene-vinyl alcohol copolymer ("Eval EP-E", ethylene content: 45 mol% and an average degree of polymerization: 1,500, made by Kuraray Co., Ltd.) was dissolved in m-cresol at 80° C. and the resulting mixture was poured into an acetone/methanol mixed solvent to precipitate powder. The precipitated powder was washed and dried, and then subjected to cyanoethylation in the same manner as in Example 1 to yield a cyanoethylated ethylene-vinyl alcohol copolymer having the degree of cyanoethylation of about 60%.

The film formed from the copolymer had a dielectric constant of 16 at 1 KHz.

The copolymer was pressed at 180° C. between two 100μ thick aluminum foils. The copolymer film was not peeled off easily from the aluminum foil and where the aluminum foil was forced to peel off, the aluminum foil was broken. Thus, the copolymer film had excellent bonding properties.

In addition, the copolymer obtained was superior in heat resistance and did not show any degradation when exposed to a temperature at 100° C. overnight.

Figure 2:
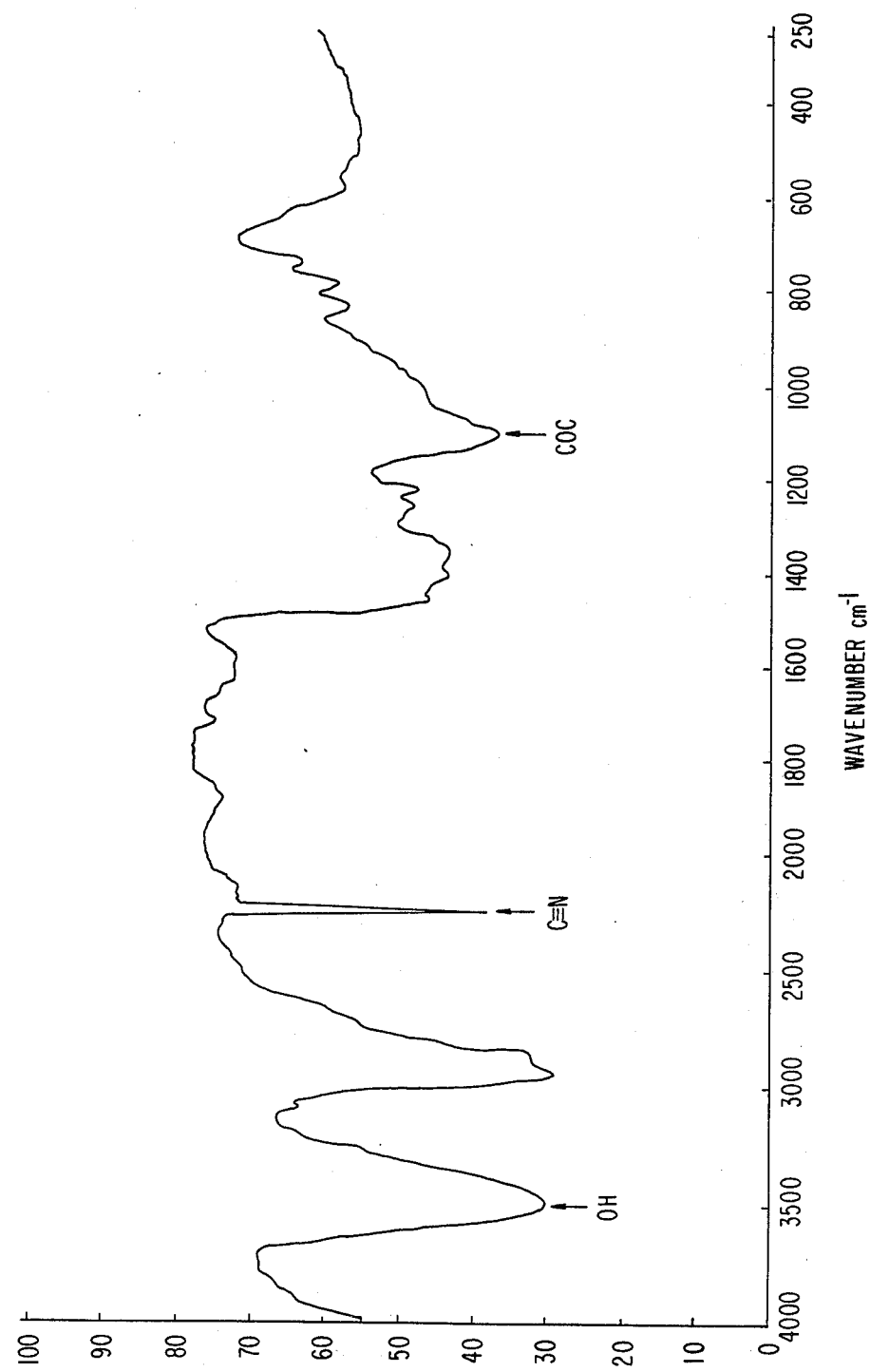

The infrared absorption curve of the film is shown in FIG. 2.

EXAMPLE 3

A ZnS illuminant containing Cu and Al and the cyanoethylated copolymer obtained in Example 1 in a volume ratio of 60/40 were mixed in acetone to dissolve the resin in acetone. The resulting solution was applied to a 100μ thick aluminum foil and dried to remove acetone to form a 60μ thick illuminant layer.

On the surface of the illuminant layer opposite to the aluminum foil was formed a transparent electrode layer by bonding an ITO electrode deposited on a polyester film at 200° C. and 15 kg/cm².

The illuminant layer of the cyanoethylated copolymer had good adhesion to the aluminum foil and ITO surface, and peeling was impossible.

The element having a 60μ thick illuminant thus prepared was subjected to an application of electric field of 1 KHz 2 Vrms/μm. The brightness was 42 cd/m².

For the sake of comparison, above procedure was followed except that the cyanoethylated copolymer was replaced by cyanoethyl cellulose to prepare the electroluminescent element. The resulting element had poor adhesion to ITO electrode and illuminant and had ununiform brightness in the illuminanat. The brightness was 30 cd/m².

EXAMPLE 4

100 Parts by weight of a mixture of isobutylene 20 wt% and vinyl acetate 80 wt%, 0.2 part by weight of polyvinyl alcohol, 0.2 part by weight of 1,2-polybutadiene and 1.0 part by weight of azobisisobutyl alcohol were suspended in 300 parts by weight of water and polymerized in an autoclave at 60° C. After completion of polymerization, the resulting polymer was washed repeatedly with a large amount of water. The washed polymer was dissolved in a methanol/water (4:1 by weight ratio) mixed solvent. Sodium hydroxide was added in an amount of 0.4 mol/liter, and saponification was carried out at 50° C. for 5 hours. The saponified solution was poured into a large amount of water, and the precipitate was well washed with water. It was confirmed by the infrared analysis that the precipitate was an isobutylene-vinyl alcohol copolymer wherein at least 96% of vinyl acetate groups were saponified. The copolymer had an $\eta$ inh of 0.63 dl/g (measured in an ethanol/water (6:4 by weight ratio) mixed solution having a concentration of 0.4 g/dl at 30° C.).

10 g of the isobutylene-vinyl alcohol copolymer obtained as above was mixed with an aqueous solution prepared by dissolving 0.1 g of sodium hydroxide in 5 ml of water. 60 g of acrylonitrile was added dropwise while stirring at about 50° C. and reaction was conducted for 3 hours to obtain a completely homogeneous solution. Acrylonitrile was distilled away in vacuo from the reaction product and the distillation bottom was poured into a large amount of water to precipitate a cyanoethylated copolymer. The precipitated copolymer was washed with methanol and then dissolved in acetone. The acetone solution was poured into a large amount of water to reprecipitate the cyanoethylated copolymer. The procedure of acetone dissolution and reprecipitation was repeated three times, and the precipitate was dried in vacuo at 60° C. The resulting cyanoethylated isobutylene-vinyl alcohol copolymer had an $\eta$ inh of 0.53 dl/g (measured in dimethyl amide solution having a concentration of 0.4 g/dl at 30° C.).

An acetone solution of this cyanoethylated copolymer was cast onto an 80μ thick film. The film had a dielectric constant of 22.2 and a dielectric loss (tan $\delta$) of 1.9% at 1 KHz and 17° C.

Figure 3:
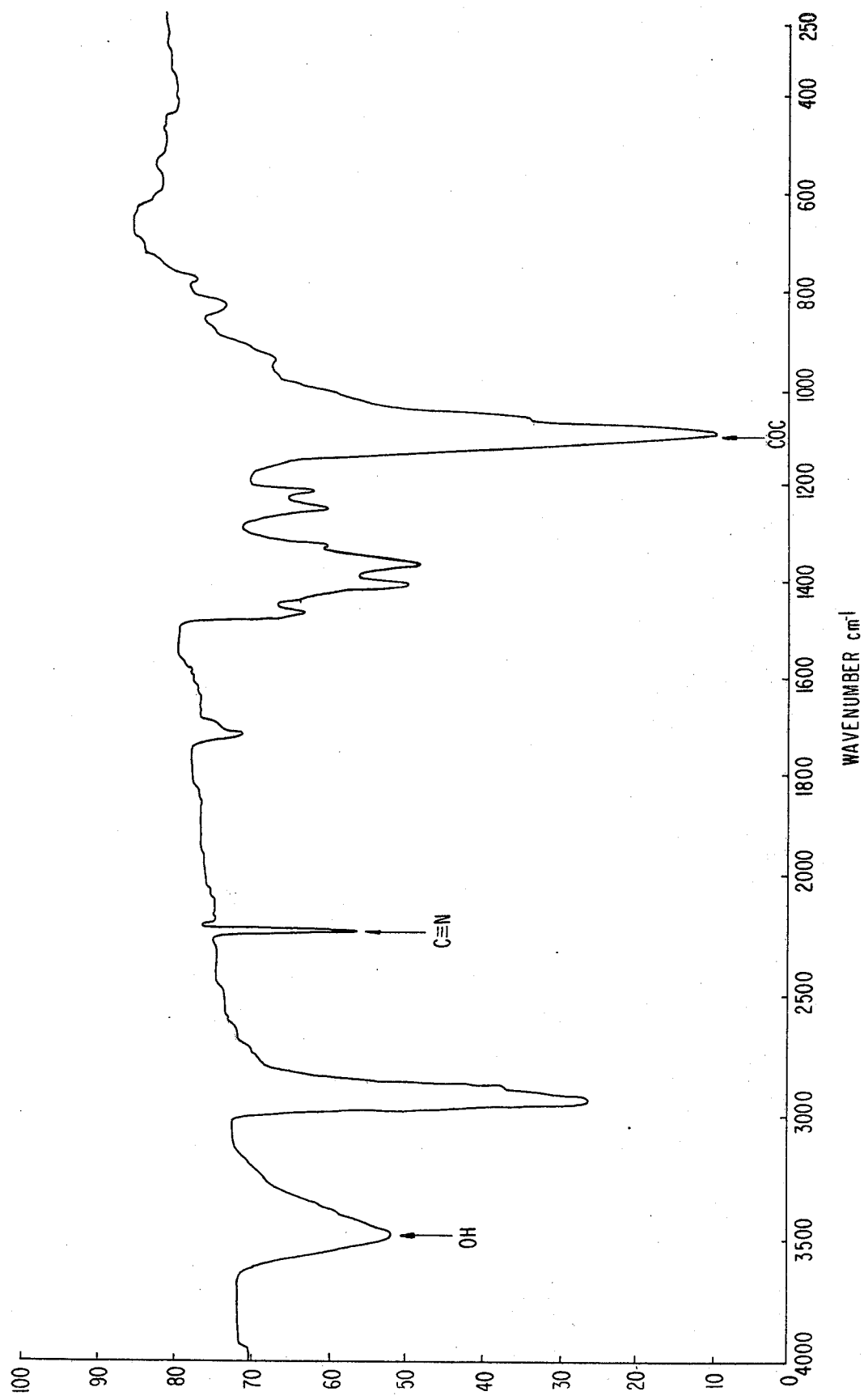

The infrared absorption curve of the film is shown in FIG. 3.

From the foregoing examples it can be understood that the dispersion type electroluminescent element of this invention has high brightness and high mechanical bending strength due to good adhesion to the aluminum foil electrode and ITO electrode and, therefore, is very useful from industrial viewpoint.

While the invention has been described in detail and with reference to specific embodiments thereof, it will be apparent to one skilled in the art that various changes and modifications can be made therein without departing from the spirit and scope thereof.

What is claimed is:

1. A cyanoethylated olefin-vinyl alcohol copolymer containing 10 to 70 mol percent olefin content, wherein the olefin has from 2 to 4 carbon atoms.

2. The copolymer of claim 1, wherein at least 10% of hydroxyl groups in the vinyl alcohol are cyanoethylated.

3. A dielectric material comprising a cyanoethylated olefin-vinyl alcohol copolymer containing 10 to 70 mol percent olefin content, wherein the olefin has from 2 to 4 carbon atoms.

4. The dielectric material of claim 3, which is a matrix resin having a high dielectric constant for a dispersion-type electroluminescent element.

5. An adhesive comprising a cyanoethylated olefin-vinyl alcohol copolymer containing 10 to 70 mol percent olefin content, wherein the olefin has 2 to 4 carbon atoms.

* * * * *